United States Patent
Hansen et al.

(10) Patent No.: US 8,708,551 B2
(45) Date of Patent: Apr. 29, 2014

(54) CONTINUOUS GRANULATOR AND METHOD OF CONTINUOUS GRANULATION OF POWDER MATERIAL

(75) Inventors: Ove Emil Hansen, Allerød (DK); Trevor Gordon Page, Southampton (GB); Michel Simon Waldron, Southampton (GB)

(73) Assignee: Collette NV, Wommelgem (BE)

( * ) Notice: Subject to any disclaimer, the term of this patent is extended or adjusted under 35 U.S.C. 154(b) by 1358 days.

(21) Appl. No.: 11/910,690

(22) PCT Filed: Apr. 18, 2006

(86) PCT No.: PCT/IB2006/000899
§ 371 (c)(1),
(2), (4) Date: Nov. 12, 2007

(87) PCT Pub. No.: WO2006/111816
PCT Pub. Date: Oct. 26, 2006

(65) Prior Publication Data
US 2008/0159067 A1 Jul. 3, 2008

(30) Foreign Application Priority Data

Apr. 18, 2005 (DK) .................................. 2005 00558

(51) Int. Cl.
*B01F 7/16* (2006.01)
*B01F 7/18* (2006.01)
*B01J 2/10* (2006.01)

(52) U.S. Cl.
USPC .......................................................... 366/301

(58) Field of Classification Search
USPC ........... 241/259; 366/82, 85, 183.2, 285, 301, 366/319; 416/115, 127, 163
See application file for complete search history.

(56) References Cited

U.S. PATENT DOCUMENTS

| 214,159 | A | * | 4/1879 | Langevin | 241/259 |
| 272,258 | A | * | 2/1883 | Howell | 241/259 |
| 505,975 | A | * | 10/1893 | Fate | 366/85 |
| 619,018 | A | * | 2/1899 | Fickelscheer | 366/285 |
| 771,141 | A | * | 9/1904 | Gesner | 165/109.1 |
| 1,071,371 | A | * | 8/1913 | Tyson | 198/664 |
| 1,116,182 | A | * | 11/1914 | Wedge | 366/153.2 |
| 1,535,808 | A | * | 4/1925 | Bracco | 416/143 |
| 1,604,975 | A | * | 11/1926 | Cornelius | 99/621 |
| 1,861,721 | A | * | 6/1932 | Scott | 99/453 |
| 1,977,955 | A | * | 10/1934 | Robinson | 241/259 |

(Continued)

FOREIGN PATENT DOCUMENTS

EP 0 330 889 A1 9/1989
FR 2 396 585 A 2/1979

(Continued)

*Primary Examiner* — Tony G Soohoo
(74) *Attorney, Agent, or Firm* — Sughrue Mion, PLLC

(57) ABSTRACT

A continuous granulator comprises a longitudinal granulation chamber having a first end with an inlet for powder material and a binder feed port and a second end with an outlet for granulated product. The granulation chamber comprises at least two parallel rotary shafts provided with granulating elements and forming an angle of from 0 to 70 degrees with the vertical. Each granulating element on a shaft comprises at least one lobe having limited extent in the circumferential direction of the shaft and interleaving with a lobe of a granulating element on another shaft. A plurality of such separate granulating elements are distributed from the inlet to the outlet, and successive granulating elements on a shaft are mutually angled.

12 Claims, 3 Drawing Sheets

(56) References Cited

U.S. PATENT DOCUMENTS

Figure 1:
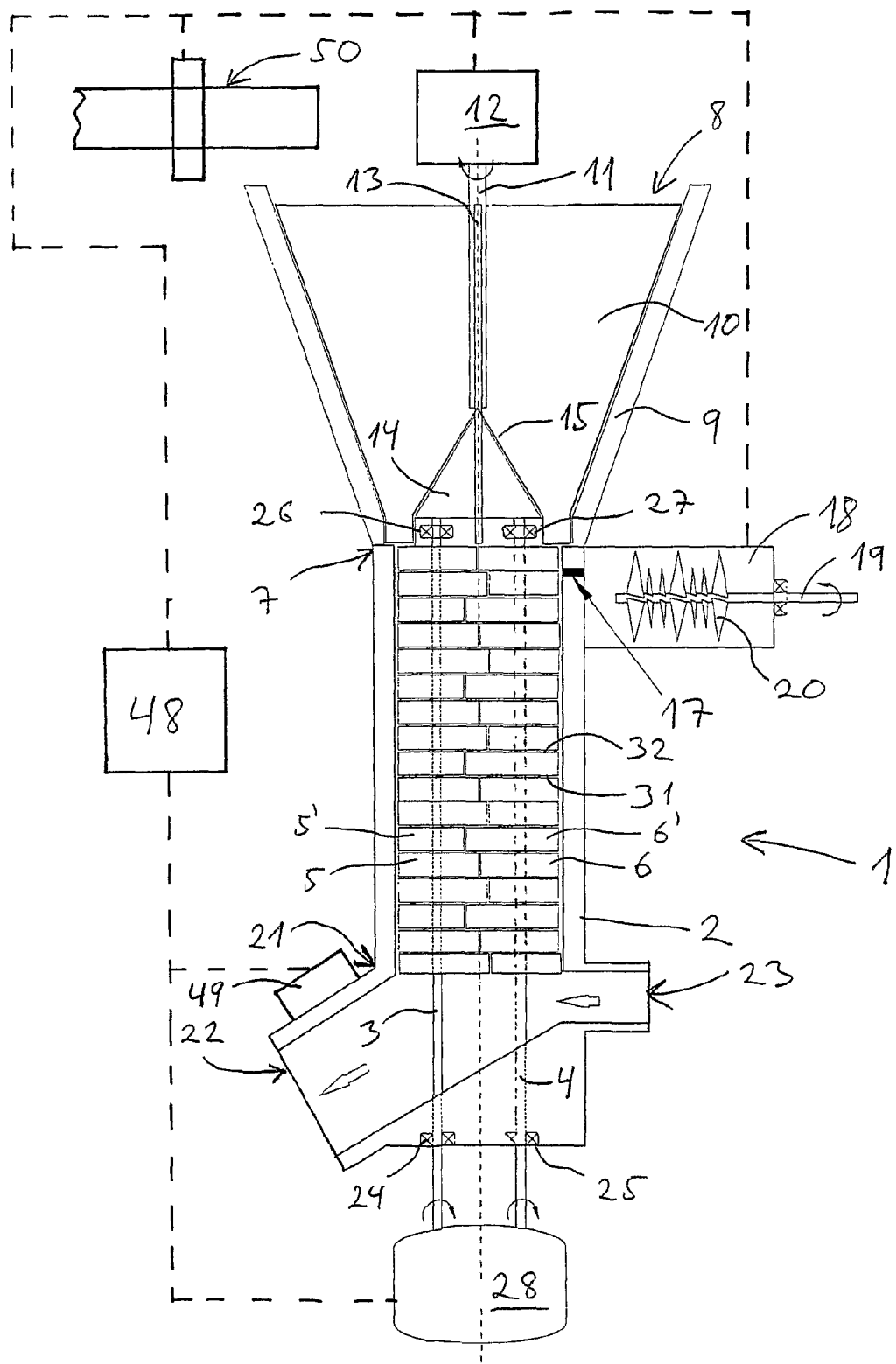

| | | | | |
|---|---|---|---|---|
| 1,991,959 A | * | 2/1935 | Roser | 366/79 |
| 2,041,619 A | * | 5/1936 | Steele | 366/75 |
| 2,611,590 A | * | 9/1952 | Jebens | 366/91 |
| 2,668,756 A | * | 2/1954 | Carney | 208/311 |
| 2,673,802 A | * | 3/1954 | Hansen | 426/519 |
| 2,750,161 A | * | 6/1956 | Simmons | 65/135.3 |
| 2,814,472 A | * | 11/1957 | Erdmenger | 366/97 |
| 2,838,780 A | * | 6/1958 | Kean | 15/104.13 |
| 2,907,555 A | * | 10/1959 | Engels | 366/76.6 |
| 2,953,460 A | * | 9/1960 | Baker | 426/19 |
| 3,122,356 A | * | 2/1964 | Erdmenger | 366/85 |
| 3,149,888 A | * | 9/1964 | Lennon | 384/130 |
| 3,198,491 A | * | 8/1965 | Loomans et al. | 366/77 |
| 3,216,706 A | * | 11/1965 | Loomans | 366/85 |
| 3,248,092 A | * | 4/1966 | Atkins | 416/122 |
| 3,387,826 A | * | 6/1968 | Loomans | 366/77 |
| 3,410,230 A | * | 11/1968 | Rossi | 425/191 |
| 3,419,250 A | * | 12/1968 | Brennan, Jr. | 366/196 |
| 3,423,074 A | * | 1/1969 | Loomans | 366/301 |
| 3,446,485 A | * | 5/1969 | Fischer | 366/103 |
| 3,576,675 A | * | 4/1971 | Abramson et al. | 252/182.1 |
| 3,608,868 A | * | 9/1971 | Koch | 366/82 |
| 3,618,902 A | * | 11/1971 | Brennan, Jr. | 366/301 |
| 3,669,416 A | * | 6/1972 | Sutter et al. | 366/145 |
| 3,734,468 A | * | 5/1973 | Cheng et al. | 366/300 |
| 3,734,472 A | * | 5/1973 | Strohmeier | 366/76.4 |
| 3,749,375 A | * | 7/1973 | Hermann et al. | 366/82 |
| 3,764,114 A | * | 10/1973 | Ocker | 366/301 |
| 3,779,522 A | * | 12/1973 | Loomans | 366/85 |
| 3,782,700 A | * | 1/1974 | Wittrock | 366/76.4 |
| 3,804,303 A | * | 4/1974 | Fassauer | 406/71 |
| 3,822,866 A | * | 7/1974 | Daester et al. | 366/8 |
| 3,901,482 A | * | 8/1975 | Kieffaber | 366/85 |
| 3,946,996 A | * | 3/1976 | Gergely | 366/139 |
| 4,188,131 A | * | 2/1980 | Duguet | 366/301 |
| 4,203,258 A | * | 5/1980 | Held | 451/219 |
| 4,236,833 A | * | 12/1980 | Blach | 366/85 |
| 4,281,934 A | * | 8/1981 | Krause et al. | 366/30 |
| 4,343,929 A | * | 8/1982 | Sugio et al. | 528/241 |
| 4,344,711 A | * | 8/1982 | Kendall et al. | 366/83 |
| 4,370,061 A | * | 1/1983 | Livingston | 366/85 |
| 4,416,606 A | | 11/1983 | Sugano et al. | |
| 4,449,908 A | * | 5/1984 | Campbell | 425/204 |
| 4,456,382 A | * | 6/1984 | Mahler, II | 366/276 |
| 4,468,128 A | * | 8/1984 | Cobey | 366/156.2 |
| 4,534,652 A | * | 8/1985 | Stade | 366/85 |
| 4,556,324 A | * | 12/1985 | Tynan | 366/85 |
| 4,591,487 A | * | 5/1986 | Fritsch | 422/134 |
| 4,663,103 A | * | 5/1987 | McCullough et al. | 264/40.4 |
| 4,686,088 A | * | 8/1987 | Fritsch | 422/135 |
| 4,697,508 A | * | 10/1987 | Tallafus | 99/517 |
| 4,764,020 A | * | 8/1988 | Moriyama | 366/76.4 |
| 4,773,654 A | * | 9/1988 | Fritsch | 277/348 |
| 4,824,256 A | * | 4/1989 | Haring et al. | 366/85 |
| 4,988,303 A | * | 1/1991 | Thomas | 366/285 |
| 5,020,916 A | * | 6/1991 | Fritsch | 366/97 |
| 5,108,711 A | * | 4/1992 | Chszaniecki | 422/135 |
| 5,186,539 A | * | 2/1993 | Manser et al. | 366/85 |
| 5,283,021 A | * | 2/1994 | Shih | 264/102 |
| 5,292,186 A | * | 3/1994 | Kubo et al. | 366/97 |
| 5,338,112 A | * | 8/1994 | Boden et al. | 366/75 |
| 5,419,251 A | * | 5/1995 | Mantius et al. | 99/510 |
| 5,439,286 A | * | 8/1995 | Kowalczyk et al. | 366/97 |
| 5,558,433 A | * | 9/1996 | Gheorghita | 366/76.4 |
| 5,814,282 A | * | 9/1998 | Lohe et al. | 422/135 |
| 5,836,682 A | * | 11/1998 | Blach | 366/84 |
| 5,851,065 A | * | 12/1998 | Ikeda et al. | 366/76.6 |
| 5,887,976 A | * | 3/1999 | Komori et al. | 366/195 |
| 6,116,770 A | * | 9/2000 | Kiani et al. | |
| 6,170,975 B1 | * | 1/2001 | Andersen | 366/82 |
| 6,211,267 B1 | * | 4/2001 | Suto et al. | 524/81 |
| 6,227,693 B1 | * | 5/2001 | Blach et al. | 366/85 |
| 6,461,552 B1 | * | 10/2002 | Geiger | 264/71 |
| 6,783,270 B1 | * | 8/2004 | Padmanabhan | 366/82 |
| 7,127,919 B2 | * | 10/2006 | Goller et al. | 65/135.3 |
| 8,177,414 B1 | * | 5/2012 | Wenger | 366/155.2 |
| 2002/0033012 A1 | * | 3/2002 | Kamp | 57/58.83 |
| 2003/0161215 A1 | | 8/2003 | Hinken et al. | |
| 2005/0013192 A1 | * | 1/2005 | Kakizaki et al. | 366/82 |
| 2005/0041521 A1 | * | 2/2005 | Herter | 366/82 |
| 2005/0152214 A1 | * | 7/2005 | Blach | 366/85 |
| 2008/0159067 A1 | * | 7/2008 | Hansen et al. | 366/301 |
| 2009/0213683 A1 | * | 8/2009 | Fukutani et al. | 366/82 |
| 2009/0263551 A1 | * | 10/2009 | Van Praag et al. | 426/519 |
| 2011/0007598 A1 | * | 1/2011 | S mann | 366/82 |
| 2013/0107659 A1 | * | 5/2013 | Schulz et al. | 366/301 |

FOREIGN PATENT DOCUMENTS

| | | | | |
|---|---|---|---|---|
| JP | 55152534 A | * | 11/1980 | B01F 7/02 |
| JP | 04097804 A | * | 3/1992 | B28C 5/14 |
| JP | 04104827 A | * | 4/1992 | B01F 7/02 |
| JP | 04326935 A | * | 11/1992 | B01F 7/16 |

* cited by examiner

CONTINUOUS GRANULATOR AND METHOD OF CONTINUOUS GRANULATION OF POWDER MATERIAL

CROSS REFERENCE TO RELATED APPLICATIONS

This application is a National Stage of International Application No. PCT/IB2006/000899 filed on Apr. 18, 2006, claiming priority based on Danish Patent Application No. PA 2005 00558, filed Apr. 18, 2005, the contents of all of which are incorporated herein by reference in their entirety.

The present invention relates to a continuous granulator comprising a longitudinal granulation chamber having a first end with an inlet for powder material and a binder feed port and a second end with an outlet for granulated product, the granulation chamber comprising at least two parallel rotary shafts provided with granulating elements.

U.S. Pat. No. 4,416,606 describes a granulator for preparing granules from a powdery material by agglomerating it through a kneading zone and breaking it into granules in a breaking zone. The granulator comprises a receptacle in which two screws having screw blades are arranged parallel to ensure intermeshing of the screw blades. The screws extend through the major part of the receptacle, first forming a forwardly conveying transport zone and subsequently forming a back and forth conveying kneading zone. Following the kneading zone, a breaking zone is arranged, in which the ends of the screw shafts have no screw blades, but are provided with a plurality of small projections on the peripheral surfaces of the screw shafts. The granulation, in other words the breaking up of the agglomerates into granules, thereby takes place in the last, small part of the receptacle, the so-called breaking zone. In this apparatus it is a disadvantage that the performance of the granulator, and consequently the character of the granules produced, to a large extent is predetermined by the configuration of the intermeshing screw blades. For instance, the pitch angle of the forwardly conveying screw blades and the backwardly conveying screw blades determines the amount of work the material is subjected to in the kneading zone.

The object of the present invention is to provide a more flexible continuous granulator.

In view of this object, the shafts form an angle of from 0 to 70 degrees with the vertical, each granulating element on a shaft comprises at least one lobe having limited extent in the circumferential direction of the shaft and interleaving with a lobe of a granulating element on another shaft, a plurality of such separate granulating elements are distributed from the inlet to the outlet, and successive granulating elements on a shaft are mutually angled.

In this way, the powder material will advance through the granulation chamber substantially by means of gravity, and the amount of work performed on the material depends very much on the feed rate of powder material to the inlet of the apparatus in relation to the rotational speed of the shafts. Thereby, the character of the resulting product, in other words for instance the density and particle size of the granules, may be controlled to a large degree by varying the feed rate at the inlet.

In terms of manufacture of the granulator, the apparatus is also very flexible, as it may easily be adapted to a desired performance just by adjusting the mutual angle between successive granulating elements when mounting these on the corresponding shaft. For instance, if granulating elements each having two opposed lobes are mounted with a mutual angle of 90 degrees, the capacity of the apparatus will be relatively low, and the amount of work performed on the material will be relatively high, resulting in relatively large and highly compacted granules. If, on the contrary, said granulating elements are mounted with a mutual angle of 5 degrees, the capacity of the apparatus will be relatively high, but the amount of work performed on the material will be relatively small, resulting in relatively small and less dense granules. Furthermore, on an existing granulator, it will be possible to change the mutual angle between successive granulating elements, thereby changing the performance of the apparatus.

In addition, the angle that the shafts form with the vertical may be varied at the manufacture of the apparatus, or the angle may be variable for subsequent adjustment during use of the apparatus. Thereby, the transport speed of the material through the apparatus may be varied, whereby the amount of granulation work conveyed to the material is varied. In this way, the quality of the granulated product may be controlled.

In an embodiment, successive granulating elements on a shaft abut each other. Thereby, a more compact apparatus, in other words a shorter granulation chamber, may be achieved.

In an advantageous embodiment in terms of structure and operation, each granulating element has opposed end faces that are perpendicular to the direction of the shafts and lateral faces that are parallel to the direction of the shafts.

In this way, the granulating elements are easy to manufacture. Furthermore, it is ensured that the rotation of the granulating elements does not contribute substantially to the transportation of the powder material in the longitudinal direction of the granulation chamber. Thereby, it is easier to control the material transport through the apparatus by means of the feed rate of the powder material and the tilt angle of the shafts and the granulation chamber.

In a further advantageous embodiment in terms of structure and operation, each granulating element is disc-shaped.

By providing the granulating elements in the form of disc-shaped elements, a large number of granulating elements may be applied, thereby giving great flexibility in terms of the possible number of different configurations that may be achieved by arranging the granulating elements in relation to each other, for instance by varying the mutual angle between successive granulating elements on a shaft.

In an advantageous embodiment, successive granulating elements on a shaft are mutually angled by at least 5 degrees, preferably at least 10 degrees and more preferred at least 15. Thereby, it is ensured that sufficient work is conferred to the powder material in order to form granules.

In an advantageous embodiment, the angle between successive granulating elements on a shaft is adjustable by means of rotation of an internal spindle arranged concentrically in said shaft. In this way, it is possible to control the performance of the granulator in a simple way by rotating said internal spindle. Furthermore, it is possible to control the performance of the granulator during operation, possibly in dependence of measured product parameters, such as density and size of the produced granules.

In an advantageous embodiment, granulating elements mounted on different shafts and having interleaving lobes are adapted to continuously be in close proximity of each other while maintaining a small clearance. In this way, efficient kneading of the powder material is ensured without unnecessary friction between the granulating elements. Furthermore, a self-cleaning effect is achieved, whereby deposits on the granulating elements are avoided.

In an advantageous embodiment, each shaft is surrounded by a partly cylindrical enclosure of the granulating chamber, and the granulating elements of said shaft have lobes adapted to pass said partly cylindrical enclosure in close proximity while maintaining a small clearance. In this way, further efficient kneading of the powder material is ensured and friction between the lobes and the cylindrical enclosure is minimized. Furthermore, a self-cleaning effect is achieved, whereby deposits on the granulating elements and said partly cylindrical enclosure are avoided.

In an advantageous embodiment in terms of structure and operation, each granulating element has a cross-section composed of two circular sections.

In an advantageous embodiment in terms of operation, the shafts form an angle of no more than 50 degrees, preferably no more than 30 degrees, more preferred no more than 15 degrees and most preferred 0 degrees, with the vertical. Thereby, it may be ensured that gravity conveys a suitable transportation force to the powder material, thereby ensuring that the powder material advances at a suitable speed through the granulation chamber.

In an advantageous embodiment in terms of structure and operation, the inlet has the form of a funnel provided with a diametrically extending rotary dividing wall. The rotary dividing wall ensures a continuous, regular feeding of the powder material to the inlet.

In an advantageous embodiment, the rotary dividing wall is provided with lower baffles in the form of flaps inclined downward against the direction of rotation of the dividing wall. The baffles will further ensure that the powder material is fed continuously and regularly to the inlet.

In an advantageous embodiment, a feed pump is arranged at the binder feed port within or immediately adjacent an enclosure of the granulation chamber, and the feed pump is independently fed with liquid, solution, suspension or gas or any combination thereof. Thereby, the nature of the binder supplied to the granulation chamber may be controlled efficiently.

In an advantageous embodiment, there is provided a processing unit or computer adapted to control processing parameters such as the speed of the rotary shafts, the feed rate of the powder material, the binder feed rate and the feed rate and proportions of liquid, solution, suspension and gas to a binder feed pump, and data from instruments for the measurement of parameters such as moisture content, density, active component, particle size and shape of the granules are fed into the processing unit or computer. Thereby the performance of the apparatus may automatically be controlled accurately.

The invention further relates to a method of continuous granulation of powder material, whereby material and binder are fed into a first end of a longitudinal granulation chamber, the material is granulated by means of granulating elements provided on at least two parallel rotating shafts extending from the first end to the second end in the granulation chamber, and granulated product is discharged from a second end of the granulation chamber.

The method is characterized by that the material is advanced from the first end to the second end substantially by means of gravity in a general direction forming an angle of from 0 to 70 degrees with the vertical, by that the material is worked successively from the first end to the second end in the granulation chamber by means of separate granulating elements, by that at least one lobe of each granulating element on a shaft interleaves with a lobe of a granulating element on another shaft during rotation of the shafts, and by that successive granulating elements on a shaft are working mutually angled. Thereby, the above-mentioned advantages may be obtained.

In an advantageous embodiment, granulating elements mounted on different shafts and having interleaving lobes continuously are in close proximity of each other while maintaining a small clearance. Thereby, the above-mentioned advantages may be obtained.

In an advantageous embodiment, processing parameters such as the speed of the rotary shafts, the feed rate of the powder material, the binder feed rate and the feed rate and proportions of liquid, solution, suspension and gas to a binder feed pump are controlled by means of a processing unit or computer, and data from instruments for the measurement of parameters such as moisture content, density, active component, particle size and shape of the granules are fed into the processing unit or computer. Thereby, the above-mentioned advantages may be obtained.

Figure 2:
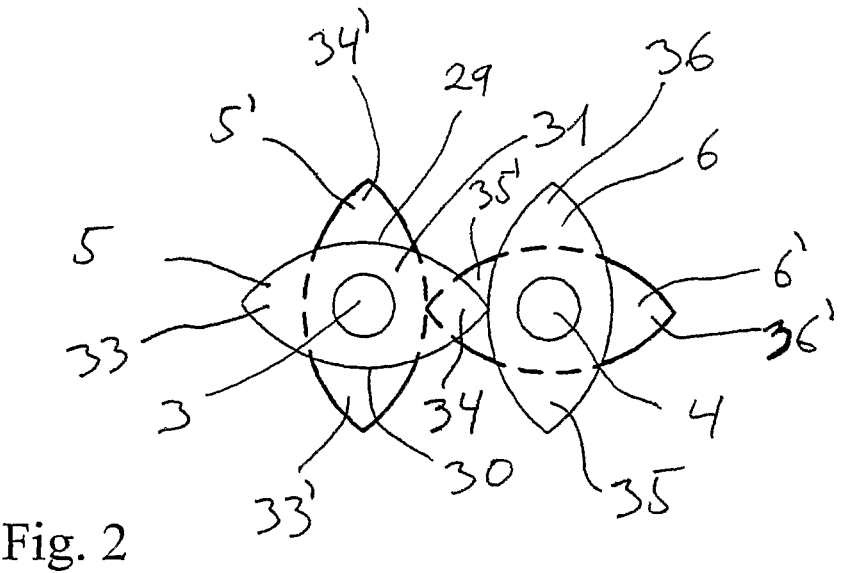
Figure 3:
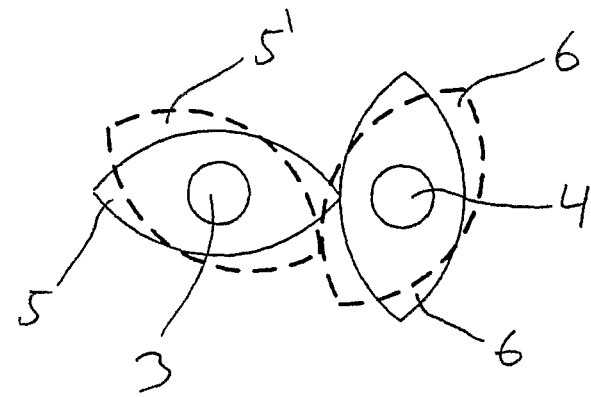
Figure 4:
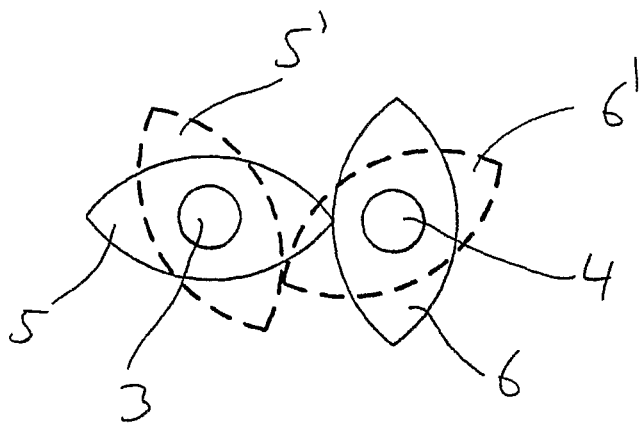
Figure 5:
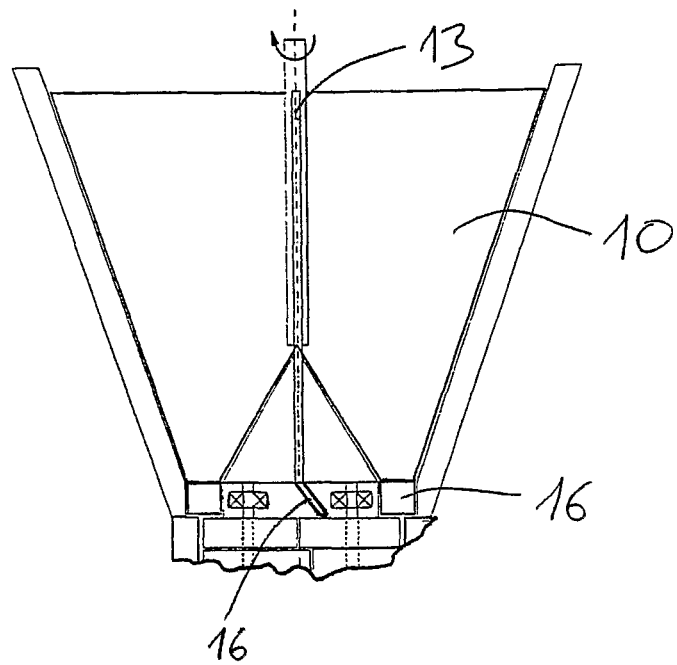
Figure 6:
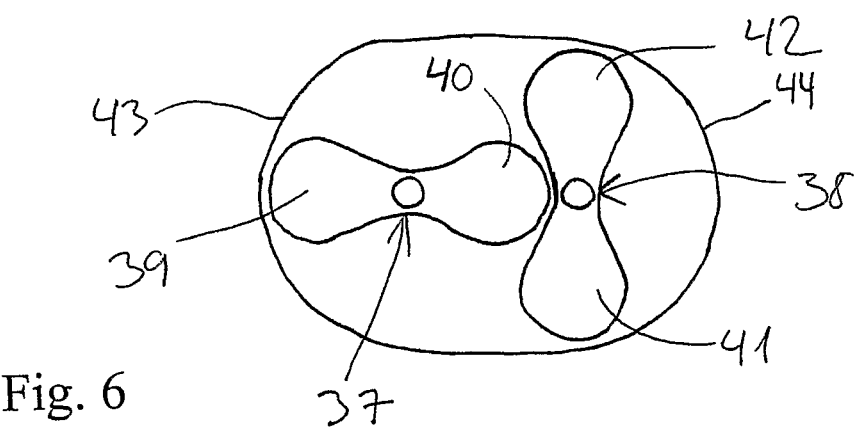
Figure 7:
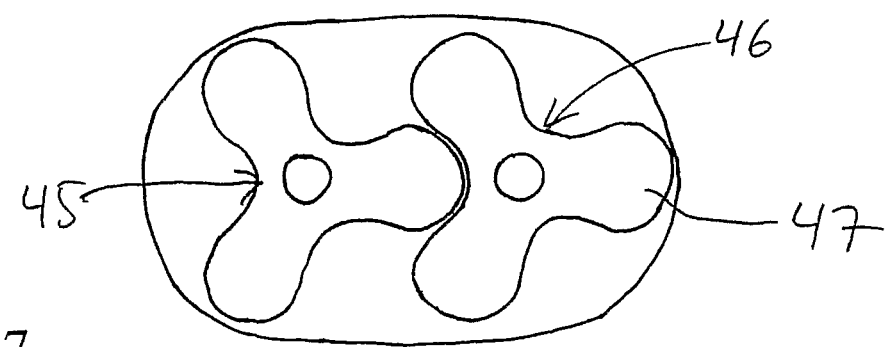

The invention will now be explained in more detail below by means of examples of embodiments with reference to the very schematic drawing, in which FIG. 1 shows an axial section through a continuous granulator according to the invention, FIGS. 2 to 4 show alternative configurations having different angles between successive granulating elements of the continuous granulator in FIG. 1, FIG. 5 shows an alternative embodiment of the inlet part of the continuous granulator in FIG. 1, and FIGS. 6 and 7 show alternative embodiments of the granulating elements of the continuous granulator in FIG. 1.

FIG. 1 shows a longitudinal cross-section through a continuous granulator 1 for granulation of powder material according to the invention, for instance of a pharmaceutical product. The granulator 1 comprises a longitudinal granulation chamber 2 in which two parallel rotary shafts 3, 4 are arranged vertically. On each shaft 3, 4 is arranged a plurality of granulating elements 5, 6.

At a first, upper end 7 of the granulation chamber 2 is arranged an inlet 8 in the form of a downwardly tapering funnel 9 through which powder material may fall by means of gravity into the granulation chamber 2 at the first end 7. In order to ensure a regular supply of the powder material to the granulation chamber, a first rotary dividing wall 10 is arranged in the funnel 9 on a vertical spindle 11 driven by a drive motor 12. In the embodiment shown, a second dividing wall 13 is arranged on the spindle 11 at right angles to the first dividing wall 10. Inside the funnel 9, at its bottom, an upwardly tapering cone 14 is arranged centrally in the funnel 9 just above the first end 7 of the granulation chamber 2. The cone 14 has a lower diameter slightly larger than the distance between the shafts 3, 4 and slightly smaller than the largest inner cross-sectional dimension of the granulation chamber 2. In this way, the cone 14 covers the upper ends of the shafts 3, 4 and ensures that the powder material is fed into the granulation chamber 2 at the periphery. The rotary dividing walls 10, 13 in the funnel 9 both have an upwardly tapering triangular cut out 15 corresponding to the cone 14.

FIG. 5 shows another embodiment of the rotary dividing walls 10, 13, whereby each dividing wall, at its bottom, is provided with baffles 16 in the form of flaps inclined downward against the direction of rotation of the dividing wall. The flaps may be a lower part of the dividing walls, which is bend, for instance 45 degrees. Thereby, the baffles 16 will rotate with the dividing walls in the space between the lower end of the cone 14 and the inside of the funnel 9, thereby facilitating a regular continuous inlet of powder material to the granulation chamber 2.

Referring again to FIG. 1, a binder feed port 17 is arranged through the wall of the granulation chamber 2 at the first end 7. A feed pump 18 is arranged immediately adjacent the granulation chamber 2 communicating directly with the binder feed port 17. Additional binder feed ports may be arranged at the first end 7 or along the granulation chamber. The binder feed pump 18 comprises a drive spindle 19 driven by a not shown motor and carrying one or more impellers 20 that are indicated schematic. The feed pump 18 may work in a well-known manner. The feed pump is independently supplied with liquid, solution, suspension or gas or any combination thereof.

At a second, lower end 21 of the granulation chamber 2, an outlet 22 for granulated product is arranged in a downwardly inclined manner. Diametrically opposite the outlet 22 in relation to the granulation chamber 2, a transport air inlet 23 is arranged, whereby transport air may be blown in the direction of the outlet 22 diametrically across the second end 21 of the granulation chamber 2, thereby carrying granulated product from the granulation chamber to the outlet 22.

The rotary shafts 3, 4 are journalled at each end in bearings 24, 25, 26, 27 and driven by means of a drive unit 28. The drive unit 28 comprises a not shown drive motor, such as an electric motor, and a not shown transmission driving the two shafts 3, 4 synchronously.

FIGS. 2 to 4 show an embodiment of the granulating elements 5, 6, whereby the granulating elements, seen in the axial direction, have a contour composed of two circular sections. Said circular sections are formed by opposed lateral faces 29, 30 that are parallel to the direction of the shafts 3, 4. In this embodiment, furthermore the granulating elements 5, 6 have opposed end faces 31, 32 that are perpendicular to the direction of the shafts 3, 4. In FIG. 2, two successive granulating elements 5, 5', 6, 6' on each shaft 3, 4, respectively, are shown in an embodiment of the granulator 1, whereby successive granulating elements are mutually angled by 90 degrees, whereby the capacity of the apparatus will be relatively low, and the amount of work performed on the powder material will be relatively high, resulting in relatively large granules. FIG. 3 shows another embodiment, whereby the angle between successive granulating elements 5, 5', 6, 6' is 30 degrees, resulting in a higher capacity of the apparatus than that of the above described embodiment, and whereby the amount of work performed on the powder material will be smaller than that of said embodiment, resulting in relatively smaller granules. FIG. 4 shows successive granulating elements 5, 5', 6, 6' mutually angled by 60 degrees, resulting in capacity and work loads in between those of the two above described embodiments, as well as granules of a size lying in between those of said embodiments.

Each of the granulating elements 5, 5', 6, 6' shown in FIGS. 2 to 4 comprises two opposed lobes 33, 34, 35, 36. The lobes 33, 34, 35, 36 are to be understood as the extremities of the granulating elements 5, 6. Therefore, in the circumferential direction of a shaft 3, 4, the lobes of granulating elements mounted on said shaft have limited extent. As mentioned above, the shafts 3, 4 are driven synchronously, and consequently, starting from for instance the situation shown in FIG. 2, one of the lobes 33, 34 of a granulating element 5 mounted on a shaft 3 will always be very close to, although not actually touching, the contour of a granulating element 6 mounted on another shaft 4. In the situation shown in FIG. 2, the lobe 34 of the granulating element 5 interleaves with, that is, acts in between the lobes 35, 36 of the granulating element 6.

All adjacent granulating elements on a shaft may be mutually angled by the same angle, for instance 90 degrees, or by different angles. For instance, a row of successive granulating elements on a shaft may be mutually angled alternatively by 90 degrees and 30 degrees. For instance a sequence of successive relative rotation angles between granulation elements in a row could be +15, +15, −15, −15, +15, +15 degrees ... or for instance +5, +10, +15, −90, +90, +5, +10, +15 degrees .... Many variations are possible according to the invention.

Due to the vertical arrangement of the granulation chamber 2 and the rotary shafts 3, 4, the powder material advances downwardly through the granulation chamber substantially as a result of the gravity. The granulation chamber 2 and the rotary shafts 3, 4 may also be tilted by an angle of up to 70 degrees with the vertical. Different tilt angles will result in different capacities of the granulator. In the vertical arrangement shown in FIG. 1, the gravity will cause a relatively large capacity of the granulator, and by an inclination of the shafts 3, 4 of 70 degrees in relation to the vertical, the gravity will result in a relatively smaller capacity of the granulator. The tilt angle of the shafts 3, 4 may be adjustable manually or automatically.

FIG. 6 shows another embodiment of the granulating elements, whereby each granulating element 37, 38 has the form of a butterfly composed of two opposed tongue-formed lobes 39, 40, 41, 42. It is also apparent from FIG. 6 that an enclosure of the granulation chamber has a cross-section comprising two partly cylindrical walls 43, 44 that the tongue-formed lobes 39, 40, 41, 42 sweep closely; however without touching. FIG. 7 shows another embodiment, whereby each granulating element 45, 46 has three equally distributed tongue-formed lobes 47. Many other embodiments of the granulating elements than those shown are possible. Furthermore, more than two shafts provided with granulating elements may be arranged in the granulation chamber in any suitable way. In addition, the number of granulating elements on a shaft may be varied in order to obtain a desired performance of the granulator.

According to the present invention, the granulation chamber 2 forms a single granulation zone extending from the first end 7 to the second end 21. Throughout the granulation zone, a plurality of cooperating pairs of granulating elements forms several granulating segments in which the powders and the binder are being worked, whereby the powders are contacted with the binder and brought into intimate contact such that binding between the particles occurs, either by action of a binder already dissolved into the granulating liquid or by virtue of the dissolving some of the powder into the granulating liquid to form a binder solution.

Consequently, granulation takes place gradually from the inlet to the outlet through a row of similar granulating segments, as opposed to known granulators, in which the material is firstly agglomerated through a dedicated agglomeration zone and subsequently broken up into granules in a dedicated breaking zone that is much shorter than the agglomeration zone. Consequently, according to the present invention, a more uniform granulation result is achieved, because no dedicated breaking zone is present. However, in some cases, the granulator according to the present invention may be followed by a minor auxiliary treating zone in which additional granulation or breaking of some granules may take place.

As shown in FIG. 1, the granulator may be controlled by means of a processing unit or computer 48 connected to one or more transducers illustrated schematic by means of a box 49 for the measurement of process parameters such as moisture content, density, active component, particle size and shape of the produced granules at the outlet 22. The box 49 may, among other things, contain instruments such as a near-infrared device, a microwave device or the like. The processing unit or computer 48 is adapted to control the drive unit 28 that rotates the shafts with the granulating elements, a powder feeder 50, the drive motor 12 rotating the dividing walls 10, 13 in the funnel 9 and the feed pump 18, and possibly more operational parameters. Furthermore, by means of a not shown actuator, the processing unit or computer may control the tilt angle of the granulation chamber 2 and the rotary shafts 3, 4 in relation to the vertical.

The design of the feeding system and feed control system is such that the flow of material into the granulating segments is controlled relative to the total capacity of the granulator. In this way, the volume of material within each of the granulating segments and the level of compression within each segment are controlled such that the granulating elements do not work against a solid incompressible volume of powder. In addition, controlling the material feed relative to the overall capacity of the granulator enables the amount of work done on the powder to be controlled and hence the level of contact and subsequent compaction leading to granule growth and densification can be controlled enabling granules of a desired size and density to be produced.

By controlling the relative fill volume of the granulating space by means of controlling the feed of material relative to a calculated model or measured maximum capacity for the granulator, it is possible to produce granules with properties that can be adjusted to suit the requirements of for instance a dose form for which the granule is intended to be used.

Successive granulating elements 5, 5', 6, 6', 37, 38, 45, 46 may be mounted on two different shafts (not shown) arranged concentrically and rotatably within each other, so that the mutual angle between the successive granulating elements is adjustable by rotation of the two concentric shafts in relation to each other. The rotation of the two concentric shafts in relation to each other may be performed by means of an actuator that may be controlled by the processing unit or computer 48, possibly during operation of the granulator 1.

The invention claimed is:

1. A continuous granulator, comprising:
a longitudinal granulation chamber having a first end with an inlet for powder material and a binder feed port and a second end with an outlet for granulated product, the granulation chamber comprising only one pair of parallel rotary shafts provided with granulating elements,
wherein the one pair of shafts forms an angle of from 0 to 70 degrees with the vertical,
wherein each granulating element on a shaft comprises one lobe having limited extent in the circumferential direction of the shaft and interleaving with a lobe of a granulating element on another shaft,
wherein a plurality of said separate granulating elements are distributed from the inlet to the outlet,
wherein successive granulating elements on a shaft are mutually angled, and
wherein a feed pump is arranged at the binder feed port within or immediately adjacent an enclosure of the granulation chamber, and the feed pump is independently fed with liquid, solution, suspension or gas or any combination thereof.

2. A continuous granulator according to claim 1, wherein successive granulating elements on a shaft abut each other.

3. A continuous granulator according to claim 1, wherein each granulating element has opposed end faces that are perpendicular to the direction of the shafts and lateral faces that are parallel to the direction of the shafts.

4. A continuous granulator according to claim 1, wherein each granulating element is disc-shaped.

5. A continuous granulator according to claim 1, wherein successive granulating elements on a shaft are mutually angled by an angle of at least 5 degrees.

6. A continuous granulator according to claim 1, wherein granulating elements mounted on different shafts and having interleaving lobes are adapted to continuously be in close proximity of each other while maintaining a small clearance.

7. A continuous granulator according to claim 1, wherein each shaft is surrounded by a partly cylindrical enclosure of the granulation chamber, and in that the granulating elements of said shaft have lobes adapted to pass said partly cylindrical enclosure in close proximity while maintaining a small clearance.

8. A continuous granulator according to claim 1, wherein each granulating element has a cross-section composed of two circular sections.

9. A continuous granulator according to claim 1, wherein the shafts form an angle of no more than 50 degrees with the vertical.

10. A continuous granulator according to claim 1, wherein the inlet has the form of a funnel provided with a diametrically extending rotary dividing wall.

11. A continuous granulator according to claim 10, wherein the rotary dividing wall is provided with lower baffles in the form of flaps inclined downward against the direction of rotation of the dividing wall.

12. A continuous granulator according to claim 1, further comprising a processing unit or computer adapted to control processing parameters including at least one of a speed of the rotary shafts, a feed rate of the powder material, a binder feed rate and a feed rate and proportions of liquid, solution, suspension and gas to a binder feed pump, and wherein data from instruments for the measurement of parameters including at least one of moisture content, density, active component, particle size and shape of the granules are fed into the processing unit or computer.

* * * * *